UNITED STATES PATENT OFFICE.

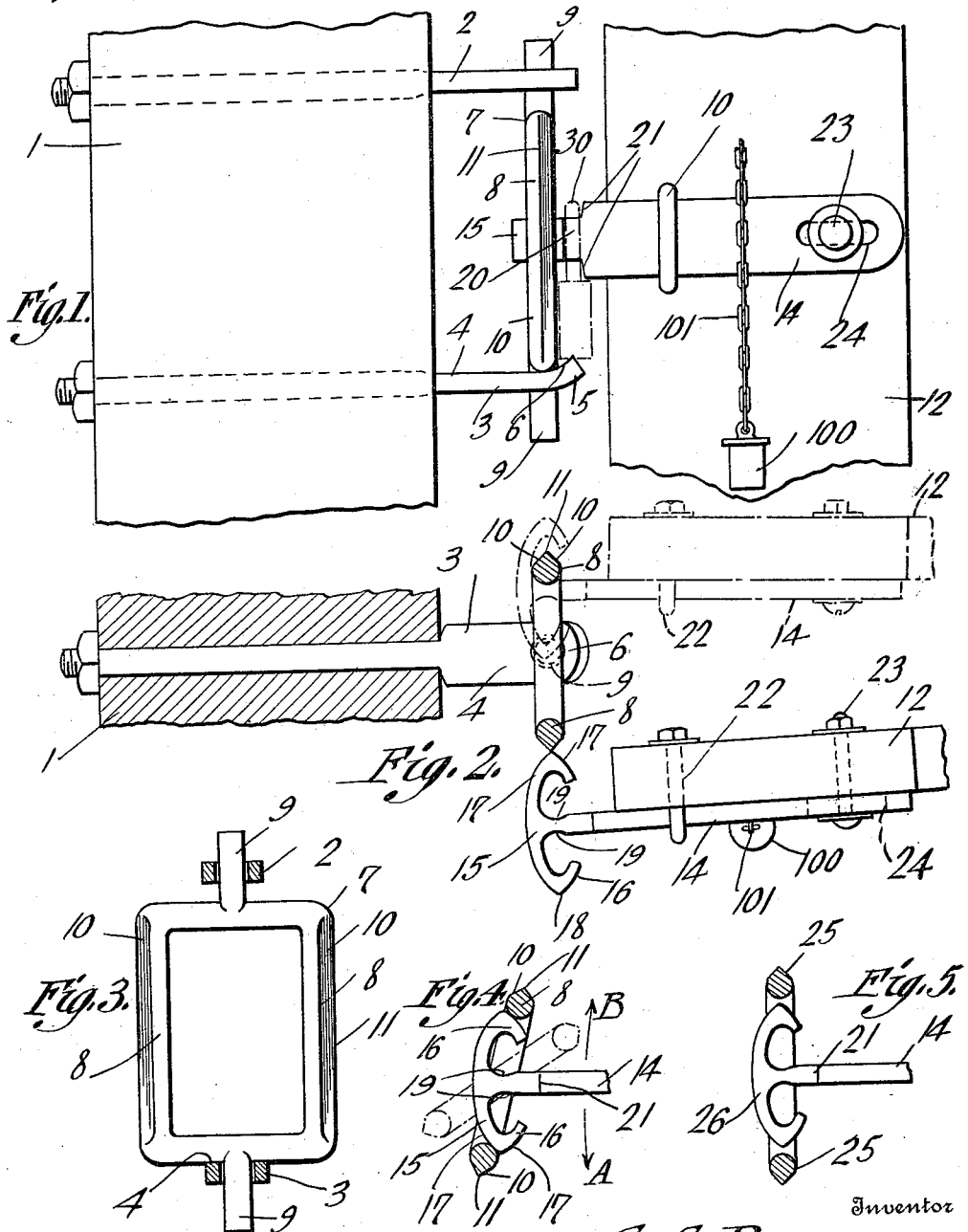

CHARLEY C. ROSS, OF SPRINGFIELD, MISSOURI, ASSIGNOR OF ONE-HALF TO JOHN C. DYSART, OF SPRINGFIELD, MISSOURI.

GATE-LATCH.

1,279,162.  Specification of Letters Patent.  Patented Sept. 17, 1918.

Application filed March 22, 1918. Serial No. 223,996.

*To all whom it may concern:*

Be it known that I, CHARLEY C. ROSS, a citizen of the United States, residing at Springfield, in the county of Greene and State of Missouri, have invented a new and useful Gate-Latch, of which the following is a specification.

The device forming the subject matter of this application is a latch of that general type in which a T-shaped member on a gate coöperates with a loop-shaped keeper journaled on a gate-post, and one object of the invention is so to construct the latch-proper and the keeper that the parts will always coact when the gate is swung to a closed position, it being impossible for the gate to bound back into an open position.

Another object of the invention is to provide novel means whereby the latch is adapted to receive a padlock, to the end that the latch and the keeper may be held against relative movement, thereby preventing the gate from being opened.

A further object of the invention is to provide novel means for holding the keeper in position to be engaged by the latch.

It is within the province of the invention to improve generally and enhance the utility of devices of that type to which the present invention appertains.

Changes such as a mechanic might make may be resorted to within the scope of what is claimed, without departing from the spirit of the invention.

In the drawings: Figure 1 shows in side elevation, a device constructed in accordance with the invention; Fig. 2 is a top plan wherein parts appear in section; Fig. 3 is an elevation of the keeper, the supports for the keeper being in section; Fig. 4 is a sectional view in the nature of a diagram; Fig. 5 is a view similar to Fig. 4 but showing a modification in the invention, adapting the same to a two-way gate.

The numeral 1 marks a gate post carrying an upper support 2 and a lower support 3. The lower support 3 has a flat horizontal upper surface 4, the support being bent up at its free end, so that the upper surface extends upwardly at an angle to the horizontal, as shown at 6 at the free end of the lower support 3.

The numeral 7 marks a loop shaped keeper including side bars 8 and spindles 9, the latter elements being journaled in the supports 2 and 3. The keeper 7 is supported on the lower member 3 as clearly shown in Fig. 1. The side bars 8 of the keeper 7 are beveled transversely in opposite directions as shown at 10 to form upright longitudinal edges 11.

The numeral 12 denotes a gate, and a latch is carried by the gate, the latch being of T shape and including a shank 14 and a transverse head 15 having arms 16 which project inwardly toward the shank. The outer surfaces of the head and the arms are mutually inclined as shown at 17 to form upright edges 18. As indicated at 19, the side faces of the shank 14 converge at a point close to the head 15. Vertically, the shank 14 is reduced in width as shown at 20, close to the head 15, to form shoulders 21. The shank 14 of the latch is attached to the gate 12 by means of a U bolt 22 and by means of a bolt 23, the latter working for adjustment in a slot 24 formed in the shank of the latch, it being possible to adjust the latch toward and away from the keeper 7 so that the head 15 of the latch may coöperate with the keeper in a way to be pointed out hereinafter.

The general operation of a device of this sort is well understood, but, referring to Fig. 2, it will be understood that when the gate 12 is swung to a closed position in the direction of the arrow C the head 15 of the latch tilts the keeper 7, one of the side bars 8 ultimately being engaged behind one of the arms 16 of the keeper.

Owing to the fact that the head 15 of the keeper and the arms 16 are mutually inclined as shown at 17 to form the upright edges 18 and since the side bars of the keeper 7 are beveled as shown at 10 to form the longitudinal edges 11, it will be impossible for the gate to swing toward a closed position and bound back into an open position, the latch always effecting a swinging of the keeper and an interlocking of the keeper and the latch.

Since the sides of the shank 14 of the latch converge as shown at 19, the side bar 8 of the keeper will be directed toward the head 15 and will remain within the control of the arms 16, when the gate swings slightly in the wind or for any other reason.

The hasp 30 of a pad lock may be placed around the reduced part 20 of the shank of the latch and be held by the shoulders 21 in such a position as to close the space between the end of the arm 16 and the shank of the latch, thus to hold the side bar 8 of the keeper behind the arm 16 and to prevent the gate from being open. The pad lock will exercise its function with equal certainty whether the pad lock be mounted on the shank of the latch from one side of the gate or the other.

Referring to Fig. 4 it will be observed that the length of the head 15 of the latch is greater than the distance between the side bars 8 of the keeper 7. As a consequence it will be impossible to open the gate in the wrong direction, thereby straining or breaking the hinges, assuming that the device is used on a one-way gate. Thus, in Fig. 4, the gate may be swung to an open position in the direction of the arrow A, but if an attempt is made to swing the gate to an open position in the direction of the arrow B, the side bar 8 will again engage behind the arm 16.

If the device is to be used on a two-way gate, then the head 26 is shorter than the distance between the side bars 25 of the keeper, as shown in Fig. 5. The parts in Fig. 5 are arranged as shown, in order that the relative dimensions of the keeper and head of the latch may appear clearly.

Since the free end of the lower support 3 is inclined upwardly as shown at 5, the keeper 7 will always be maintained in such a position that it will coöperate properly with the latch head 15. The construction shown is not the equivalent of one wherein the lower part of the keeper is seated in a pronounced notch. When the keeper is seated in a pronounced notch, the member 3 has too positive a hold on the keeper, and when the end of the head 15 strikes the side bar 8 of the keeper the gate will bound back into an open position without disengaging the bottom of the keeper from the notch. In the present construction wherein the upwardly bent end 5, the inclined surface 6 and the flat horizontal surface 4 are employed, the member 3 has a sufficient hold on the keeper to maintain the same in proper position, without retaining the keeper so positively that the head 15 of the latch may bound off the side bar of the keeper in the way hereinbefore alluded to.

At times it may be desirable to swing the gate to and from a closed position without having the gate latch in a closed position. Such an operation may take place for instance when cattle are being sorted and let through the gate one at a time. A filler 100 is attached by means of a chain 101 to the gate and this filler may be placed within the space formed by the arm 16, the part 15 and the shank 14 of the latch, so as to prevent the side bar 8 of the keeper from engaging behind the arm 16.

I claim:—

1. In a device of the class described, a loop-shaped keeper comprising side bars each of which is beveled transversely in opposite directions to form a longitudinal edge; means for supporting the keeper for rotation; and a gate-carried latch including a shank, and a transverse head having arms which project toward the shank, the outer surface of the head and the outer surfaces of the arms being mutually inclined to form upright edges which coöperate with the beveled parts of the bars of the keeper.

2. In a device of the class described, a loop-shaped keeper; means for mounting the keeper for rotation; a latch including a gate-carried shank, and a transverse head having arms which project toward the shank, the head coöperating with the keeper, the shank of the latch being reduced in width adjacent to the head for the reception of a padlock, and to form a shoulder adapted to hold a padlock close to the ends of the arms.

3. In a device of the class described, a loop-shaped keeper; means for mounting the keeper for rotation; a latch including a gate-carried shank, and a transverse head having arms which project toward the shank, the head coöperating with the keeper, the side surfaces of the shank, opposite to the ends of the arms, and close to the head, being disposed in converging relation.

4. In a device of the class described, a loop-shaped keeper comprising side bars; means for mounting the keeper for rotation; and a latch including a gate-carried shank, and a transverse head coöperating with the side bars of the keeper, the length of the head of the latch being greater than the distance between the side bars of the keeper.

5. In a device of the class described, a loop-shaped keeper; a T-shaped gate-carried latch coöperating with the keeper; and upper and lower supports wherein the keeper is journaled, the lower support having a flat upper horizontal surface which extends upwardly at an incline to the horizontal at the free end of the lower support, to coöperate with the lower part of the keeper and to hold the keeper for engagement by the latch.

In testimony that I claim the foregoing as my own, I have hereto affixed my signature in the presence of two witnesses.

CHARLEY C. ROSS.

Witnesses:
 IVY E. SIMPSON,
 M. BEN LAWTON.

Copies of this patent may be obtained for five cents each, by addressing the "Commissioner of Patents, Washington, D. C."